June 26, 1973     A. G. HEBEL, JR., ET AL     3,741,820
METHOD FOR STRESS RELIEVING METAL
Filed Dec. 7, 1970     3 Sheets-Sheet 3
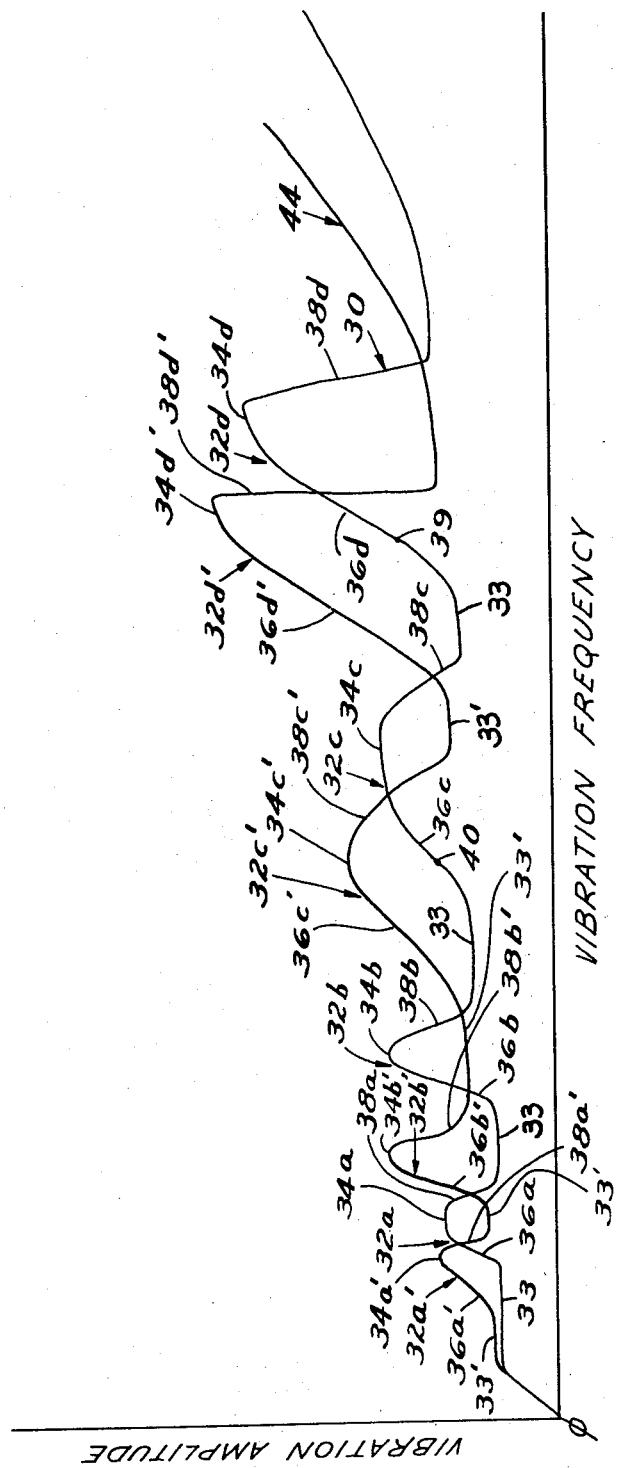
INVENTORS
AUGUST G. HEBEL, JR.
AUGUST G. HEBEL, III
BY
Barnes, Kisselle, Raisch & Choate
ATTORNEYS

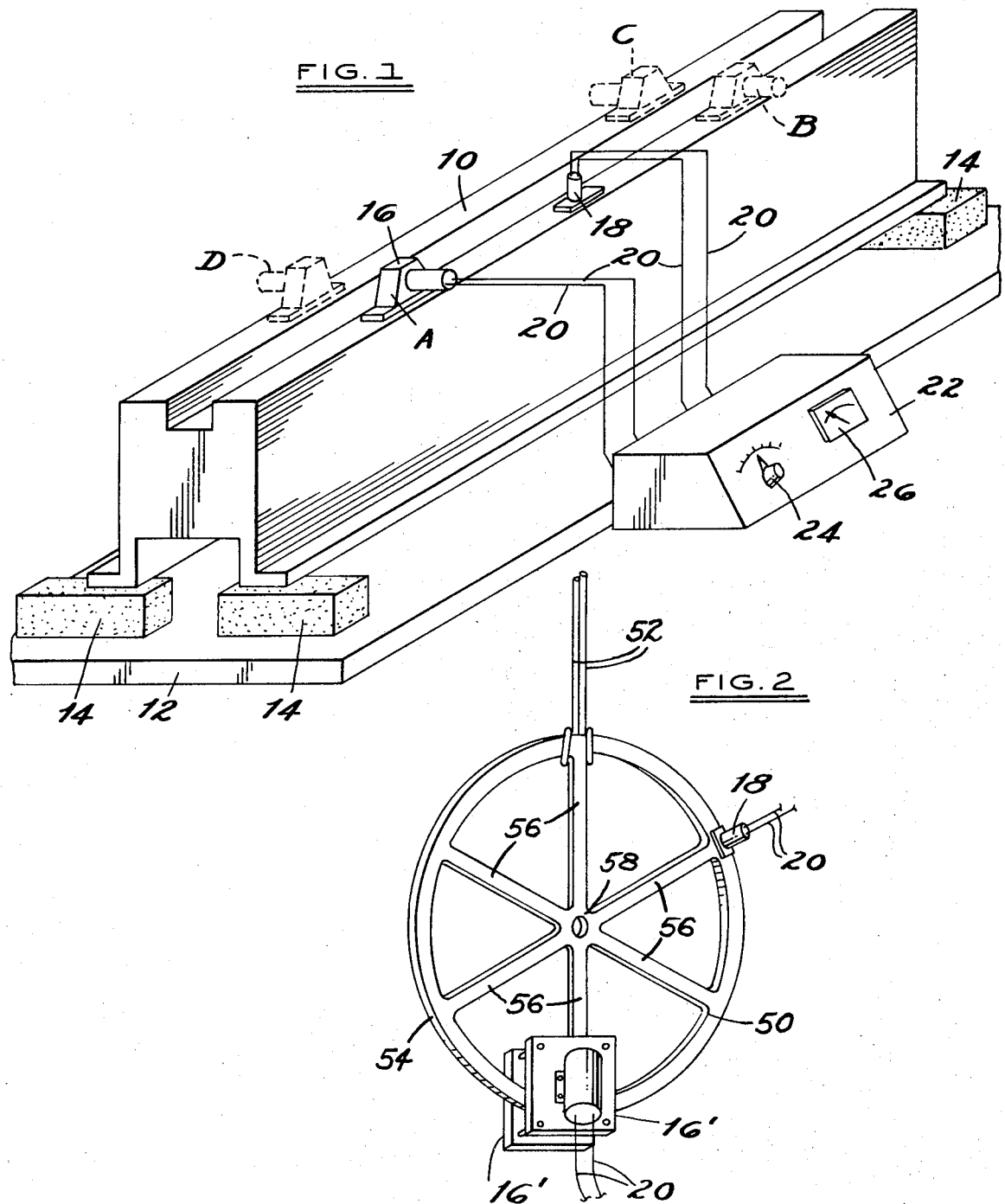

United States Patent Office 3,741,820
Patented June 26, 1973

---

3,741,820
METHOD FOR STRESS RELIEVING METAL
August G. Hebel, Jr., and August G. Hebel III, both of 1257 18th St., Detroit, Mich. 48216
Filed Dec. 7, 1970, Ser. No. 95,852
Int. Cl. C21d 1/04
U.S. Cl. 148—12.9                16 Claims

ABSTRACT OF THE DISCLOSURE

The method for stress relieving metal by vibration wherein the frequency locations of vibrational resonant peaks are found in the stressed metal and the metal is vibrated at a preferred stress relieving frequency to change the frequency locations of these resonant peaks. When the resonant peaks stabilize in new frequency locations, stress removal is complete. The preferred stress relieving frequency is selected from the vibrational response characteristics of the metal and is very efficient in relieving stresses.

---

This invention relates to a method for stress relieving metal.

The problem of residual stresses in metal is well known to those engaged in the metal working arts. These stresses lead to early warpage and corrosion of the metal and reduce its tensile strength. Among the many methods and processes which are useful in reducing residual stresses are heat treating, aging and vibration. It is not known why these processes relieve residual stresses although explanations can be offered on theoretical bases.

One of the methods for reducing residual stresses in metal involves the use of harmonic vibrations. In this method the stressed part is vibrated over a range of frequencies, preferably by a vibrator clamped to the part. The vibration amplitude is observed as this frequency range is traversed. As in any rigid metallic part, the vibration amplitude depends upon the vibration frequency; that is, at certain frequency ranges within the traversed range, the vibration amplitude noticeably increases. The frequencies at which these noticeable increases attain maximum amplitude are termed resonant peaks. The stressed part is then vibrated at a stress relieving frequency equal to the frequency of one of these resonant peaks. While this method reduces residual stress, its efficiency is poor. It is believed that this inefficiency results from only a small amount of the total energy of the vibrator being used to relieve the residual stresses, whereas a large amount sustains resonant vibrations in the part. A further problem with this type of method resides in the inability to accurately indicate when the stress removal process is complete.

While evidence of the presence of residual stresses is manifested by the aforementioned effects, the stresses themselves cannot be seen. No one really knows what these stresses are or why they occur although a plausible explanation is suggested by atomic theory. According to this theory, in a metal in which no residual stresses are present, atoms of the metal are in balanced atomic states with respect to each other. In a metal having residual stresses some of the atoms are in unbalanced states with respect to other atoms, and the degree of unbalance in the metal's atomic structure determines the magnitude of residual stresses.

We have discovered a method for removing residual stresses from metal which may be explained in terms of a new principle which we will set forth in terms of an extension of atomic theory. We wish to emphasize that this method which is to be disclosed can be practiced without understanding of this theory or principle which we propose to set forth. Evidence of the successful application of our method for stress relieving metal is aptly demonstrated by the truly remarkable results which we have achieved with many metal alloys, both ferrous and non-ferrous, of diverse size and shape.

The principle which we wish to set forth is this: The location of the natural frequency of resonance of metal can be attained only if its atoms are in balance. The converse of this principle affords a plausible explanation for the results which we have experienced with our new method. That is, if the location of the natural frequency of resonance of metal can be attained, then the atoms of the metal are in balance. With the atoms in balance, the residual stresses disappear.

According to our new method, metal having residual stresses is vibrated at a preferred frequency until the natural frequency of resonance of the metal is attained. Our method indicates when the natural frequency of resonance is attained thereby making the stress relieving process both accurate and efficient.

Briefly, our new method involves:

(1) Vibrating the metal over a range of vibrational frequencies to determine the locations on the frequency scale of the resonant peaks of the vibrations;

(2) Vibrating the metal at a preferred stress relieving frequency adjacent the frequency of one of the resonant peaks determined in step (1);

(3) Detecting changes in the locations of the resonant peaks; and (4) Detecting stability of the resonant peaks in new locations to thereby indicate that stress relief is complete.

More specifically, we have found that metal of given size and shape which contains residual stresses is characterized by resonant peaks (such as previously described) which are relocated on the frequency scale from the locations they would assume were the metal completely free from residual stresses. That is, the resonant peaks assume "false" locations in the stressed metal and "true" locations in the unstressed metal. During vibrational stress relief, the resonant peaks move from "false" locations to "true" locations. Once residual stresses are removed from the part, the locations of the resonant peaks do not change since they are in "true," or natural, locations. By observing the relocation of resonant peaks until they stabilize, we know when stress removal is complete.

Therefore, it is an object of this invention to provide a method for stress relieving metal by vibration which has a much improved efficiency.

Another object of this invention is to provide a method for stress relieving metal in which vibrational energy is imparted to the metal at a frequency adjacent the previously measured frequency of a resonant peak of the metal.

It is also an object of this invention to provide a method for stress relieving metal by vibration which accurately indicates when stress removal is complete.

It is a further object of this invention to provide a method for stress relieving metal by vibration in which reduction of stress is indicated by changes in the frequency locations of the resonant peaks of the metal.

Yet another object of this invention is the provision of a method for stress relieving metal by vibration wherein stabilization of the frequency locations of the resonant peaks of the metal indicates when stress removal is complete.

Other objects and features of the invention will be apparent in the following description and claims wherein the principles of the invention and the operation are disclosed in connection with the best mode presently contemplated for the practice of the invention.

In the drawings:

FIG. 1 is a perspective view showing apparatus which is stress relieving a steel beam according to the method of the present invention.

FIG. 2 is a perspective view showing an aluminum wheel which is being stress relieved according to the method of the present invention.

FIG. 5 is a graph showing the location of vibrational resonant peaks in a metal part before and after stress relieving.

Figure 3:
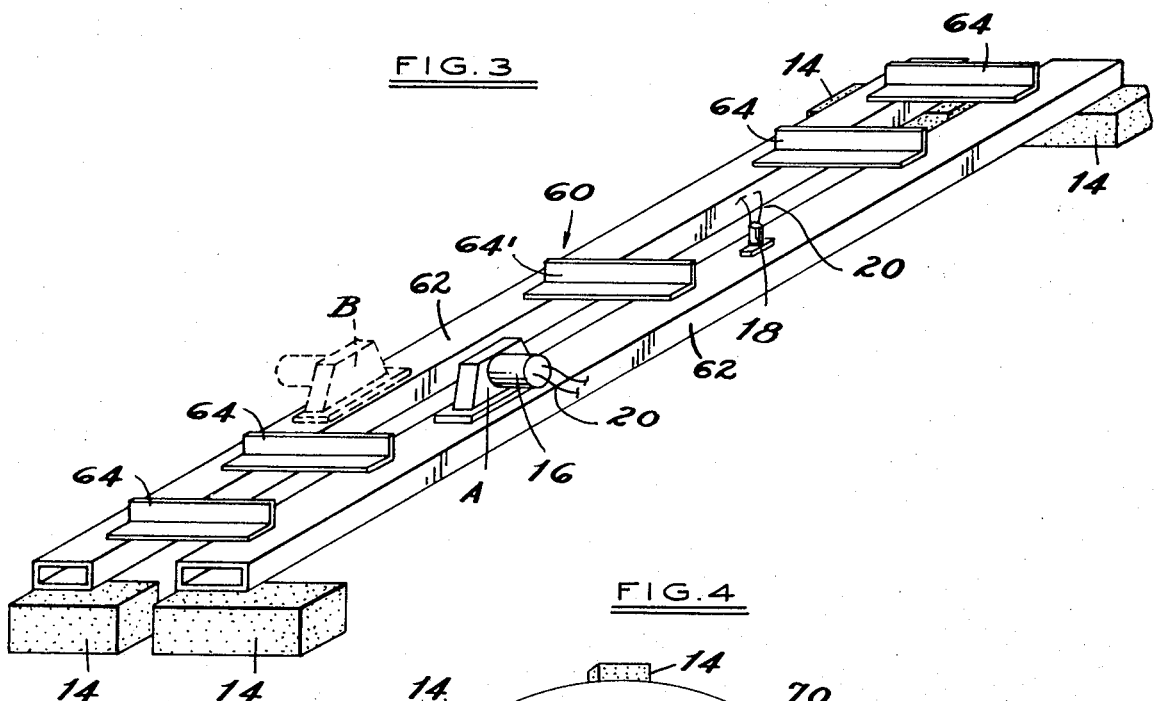
FIG. 3 is a perspective view showing a steel weldment which is being stress relieved according to the method of the present invention.

Referring now to FIG. 1, a beam 10 is supported on a floor 12 by rubber pads 14 at its four corners. A vibrator 16 is clamped to beam 10 in position A. Vibrator 16 comprises a variable speed motor, preferably of the D.C. type, driving an eccentric such that the axis of rotation of the eccentric is perpendicular to the length of beam 10 and preferably parallel to floor 12. A vibration pickup 18 is also calmped to beam 10. Pickup 18 indicates the locations of resonant peaks of vibrations in beam 10 on the frequency scale and is responsive to any parameter which indicates these locations, such as the amplitude, velocity or acceleration of vibrations. A change in the phase angle of the vibrations relative to the rotary eccentric of vibrator 16 could also be used to indicate resonant peaks, this angle being greatest at resonance. This change in phase angle is also reflected in a change in motor current. In FIG. 1, pickup 18 is responsive to vibration amplitude. Vibrator 16 and pickup 18 are electrically connected by leads 20 to a console 22. Console 22 houses a control 24 for varying change the frequency of vibrator 16 to thereby change the frequency of vibrations in beam 10. A meter 26 responsive to the amplitude of vibrations detected by pickup 18 is also mounted on console 22.

Our new method herein disclosed is described also with reference to FIG. 5. First, control 24 is changed to vary the speed of the motor of vibrator 16. This generates vibrations over a range of frequencies within beam 10, the usual frequency range being 0–10,000 c.p.m. The amplitude of vibrations is sensed by pickup 18 and indicated on meter 26. A graphical curve of vibration amplitude versus vibration frequency may be constructed from the data obtained from this frequency traverse. A typical curve is indicated by numeral 30 in FIG. 5. It should be emphasized that this curve is merely illustrative of typical vibrational response and is not intended to represent actual data. While it is not necessary to construct this curve for the practice of our invention, such a construction is useful in more clearly explaining the method of our invention.

Curve 30 comprises a plurality of hills 32a, 32b, 32c and 32d projecting upwardly from what are termed quasi-constant vibration regions 33. Hills 32a, 32b, 32c and 32d comprise respectively resonant peaks 34a, 34b, 34c and 34d (either broad or narrow relative to other peaks), upward slopes 36a, 36b, 36c and 36d extending toward their respective resonant peaks and downward slopes 38a, 38b, 38c and 38d extending away from their respective resonant peaks. The quasi-constant vibration regions 33 are essentially flat (or at most only slightly sloping) relative to hills 32 although there may be some small irregularities and variations therein.

We have found that efficient stress relief by vibration can only be effectively accomplished by operating vibrator 16 at a frequency within the range defined by one of slopes 36 or 38. More efficient operation has been found to occur by operating within the lower regions of one of upward slopes 36 preferably at a point approximately one third of the way up from the bottom of the slope.

Although the lower regions of any of upward slopes 36 define these more efficient operating points for vibrator 16, we have found that vibrator operation in these lower regions of certain hills 32 provides the most efficient stress relief of all. In particular, the lower region of the upward slope 36 of a hill 32 having a very steep downward slope 38 relative to downward slopes 38 of the other hills 32 is the optimum point for stress relieving by vibration. For curve 30, hill 32d is such a hill. We refer to this steep downward slope 38d as the main harmonic breakpoint. The preferred optimum stress relieving frequency is indicated at 39 approximately one third of the way up slope 36d.

Therefore, in interpreting the data obtained from this frequency traverse we first seek the main harmonic breakpoint. It may sometimes happen that in this frequency traverse the main harmonic breakpoint is not apparent. This is often the case in the more complex, highly stressed structure. If the main harmonic breakpoint is not obtained, we select a prominent hill such as 32c and operate vibrator 16 at the preferred stress relieving frequency for that hill indicated at 40.

As vibrator 16 operates we look for movement of resonant peaks 34 away from "false" locations and their subsequent stabilization in "true" locations. As a practical matter, it is inconvenient to traverse the frequency range as the operation of vibrator 16 continues. Therefore, we use the reading of meter 26 to indicate when stress removal is complete.

At the start of stress relieving, it is not known how long vibrator 16 must be operated to remove the stress from beam 10. It has been our experience that a duration of ten to thirty minutes is customary. At some time during this interval the reading of meter 26 changes. Since the frequency of vibrations is unchanged, this changing reading indicates that changes are occurring in the shape of the amplitude versus frequency curve previously obtained. (We again emphasize that we are looking for relocations of the frequencies of resonant peaks 34. We measure the amplitude of vibrations because it is a convenient parameter for indicating these frequency relocations). We wait until the reading of meter 26 stabilizes for several minutes (approximately two to three minutes is satisfactory) before tuning off vibrator 16.

If a second amplitude versus frequency curve is now chartered, it may assume a shape such as that indicated by curve 44 in FIG. 5 wherein those portions corresponding to similar portions of curve 30 are indicated by primed numerals. The shape of curve 44 is generally similar to that of curve 30. The shapes of some of hills 32' differ from those of curve 30; but more importantly, hills 32' are shifted to the left of hills 32. That is, the frequency locations of resonant peaks 34 have changed. (Since the frequency relocations of resonant peaks 34 are significant, it is irrelevant that the amplitudes thereof have changed; e.g., peaks 34c and 34c'). They have changed from "false" locations to stable, "true" locations. With the resonant peaks in their "true" locations, the residual stresses are gone from the portion of beam 10 in the vicinity of vibrator 16.

Continuing with FIG. 1, vibrator 16 is now moved to the position indicated at B. This is necessary because the vibrations generated by vibrator 16 are effective for stress relieving purposes only within a rather limited range. We have found that effective vibrations can propagate only approximately 7½ feet from vibrator 16, although this can vary with the rigidity of the part. Therefore, where the dimensions of the part being stress relieved are large, as in the case of beam 10, vibrator 16 must be repositioned at different locations thereon to ensure effective stress relief coverage through the part. The shape of the part also has a bearing on the location of vibration 16. With vibrator 16 positioned as indicated on beam 10, the vibrations radiate generally lengthwise of beam 10. However, the U-shaped cross-section of beam 10 necessitates the placement of vibrator 16 at positions C and D also. This is because the vibrations generated at positions A and B cannot be effectively transmitted down one side of the U and up the other side for efficient stress relief. Pickup 18 may be positioned at any location which enables meter 26 to respond to the vibrations in beam 10.

Figure 4:
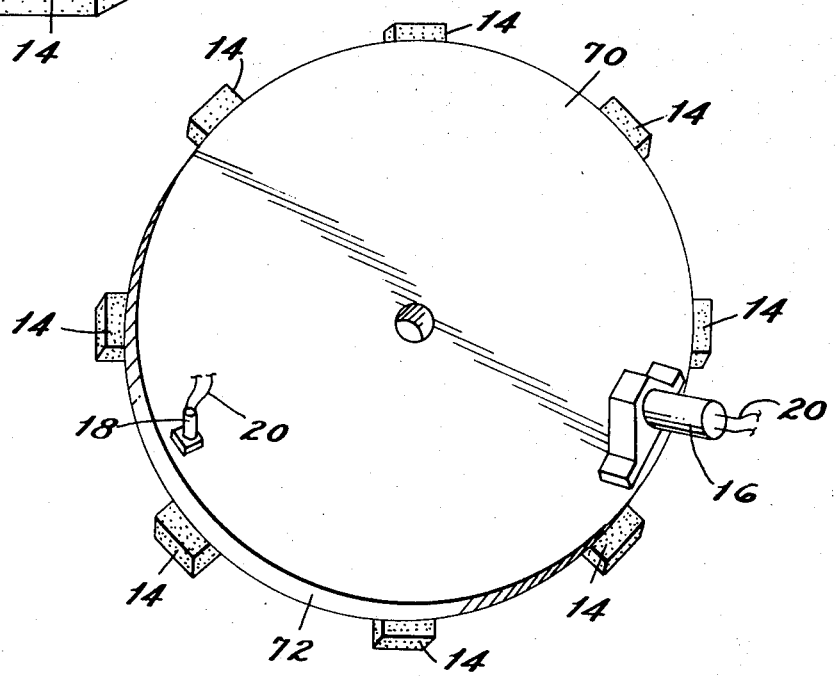
FIG. 4 is a perspective view showing a steel plate which is being stress relieved according to the method of the present invention.

FIGS. 2, 3 and 4 illustrate the applicability of our new method to other objects of diverse size and shape. In FIG. 2, vibrator 16' which is similar to vibrator 16 is clamped to a one-piece spoked aluminum wheel 50 which is pendently supported on a sling 52. Vibrator 16' is oriented adjacent the circumferential edge 54 so that the axis of rotation is perpendicular to edge 54. This arrangement is effective for relieving stresses both in the rim as well as in spokes 56 of hub 58 of wheel 50.

In FIG. 3, a steel weldment 60 comprising two tubular rails 62 to which are welded a plurality of channels 64 is supported on ruber pads 14 at its four corners. Weldment 60 is vibrated with vibrator 16 first in position A for stress relieving the nearer rail 62, and secondly in position B for stress relieving the farther rail 62.

FIG. 4 shows a circular steel plate 70 supported adjacent its circumferential edge 72 on rubber pads 14. For this application, vibrator 16 is clamped on the top of plate 70 adjacent edge 72 so that the axis of rotation is perpendicular to edge 72. With this arrangement the residual stresses are removed so that the roundness of plate 70 is held to very close tolerances.

A more detailed example of our method is described with reference to a 1" x 5" x 10' steel bar. The ends of the bar were supported on rubber pads and the bar was vibrated. The resonant peak of the hill comprising the main harmonic breakpoint was measured at 3,500 cycles per minute. The vibration amplitude at a point on the bar was measured at .063" at resonance. The vibration amplitude at a frequency corresponding to the bottom of the upward slope was measured at .004". The bar was then vibrated at a frequency within the upward slope which generated vibrations of .023" amplitude (i.e., approximately one third of the way up the slope). During vibration of approximately twenty minutes, the frequency of the resonant peak relocated and stabilized thereby proving that stress removal had occurred.

We have used motors in the range of ¼ to ½ horsepower for operating vibrator 16. For the ¼ horsepower motor we have used an eccentric providing 450 pounds force at 9,000 r.p.m., and for the ½ horsepower motor an eccentric capable of generating 2,800 pounds force at 7,200 r.p.m. When stress relieving ferrous parts, the use of the ½ horsepower motor is preferred.

Proof of our new method is further shown by the results obtained on a group of identical parts, some of which had already been treated in a furnace. The furnace-treated parts experienced only small relocations of their resonant peaks, whereas the non-furnace treated parts underwent large changes in the locations of their resonant peaks. This demonstration not only confirms the superior operation of our new method but also reveals its applicability in verifying the effectiveness of other stress relieving processes. Our new method can maintain closer part tolerances with greater consistency than can other methods previously tried. We have achieved these results with efficiency and accuracy.

As disclosed in the foregoing description, the stress relieving frequency must be determined from the vibration frequency traverse of the object to be stress relieved. It should be apparent that because of the diverse sizes and shapes of objects to which this method is suited, it is very difficult to precisely characterize the types of vibrational responses of such objects beforehand. It is conceivable that the response characteristics of some particular objects may have hills which are shaped differently from hills of other objects. Also, it should be recognized that in structures having multi-axial components there could be some overlapping of adjacent hills to thereby render the quasi-constant vibration regions very narrow and incapable of such precise definition as might otherwise be obtained in other objects. Furthermore, the slopes of the various hills need be neither smooth nor of constant slope. It is possible that not all of the resonant peaks determined in the first frequency traverse will change to new locations as the object is being vibrated at a stress relieving frequency, and hence, that the locations of some of the resonant peaks remain unchanged after the process is complete. With this understanding, it should be appreciated that the scope of this invention contemplates such situations and that this invention may still be practiced in such situations according to the teachings set forth herein.

We claim:

1. The method of stress relieving a stressed metal object comprising: vibrating the object over a range of vibrational frequencies to measure the vibrational response of the object as a function of vibrational frequency wherein a plot of said response as a function of frequency comprises a plurality of hills projecting upwardly from regions of quasi-constant response, each of said hills comprising a resonant peak, a slope extending upwardly from one quasi-constant response region with increasing frequency toward said resonant peak, and a slope extending downwardly with increasing frequency away form said resonant peak toward another quasi-constant response region;

and stress relieving the object by vibrating the object at a stress relieving frequency corresponding to a frequency within the frequency range defined by one of said slopes.

2. The method called for in claim 1 wherein said stress relieving frequency corresponds to a frequency within the frequency range defined by one of said upwardly extending slopes.

3. The method called for in claim 2 wherein said stress relieving frequency corresponds to a frequency within the frequency range defined by that portion of said one of said upwardly extending slopes which extends upwardly from a quasi-constant response region for approximately one third the height of its associated hill.

4. The method called for in claim 3 wherein said stress relieving frequency corresponds to the frequency defined by the uppermost point on said last-mentioned portion.

5. The method called for in claim 1 wherein the downward slope of one of said hills is more steeply inclined relative to the downward slopes of the other hills and wherein said stress relieving frequency corresponds to a frequency within the frequency range defined by the upwardly extending slope of said one of said hills.

6. The method called for in claim 5 wherein said stress relieving frequency corresponds to a frequency within the frequency range defined by that portion of said upwardly extending slope of said one of said hills which extends upwardly from a quasi-constant response region for approximately one third the height of said one of said hills.

7. The method called for in claim 6 wherein said stress relieving frequency corresponds to the frequency defined by the uppermost point on said last-mentioned portions.

8. The method called for in claim 1 wherein said metal is vibrated at said stress relieving frequency until the frequency location of at least one of said peaks changes.

9. The method called for in claim 8 wherein the metal is vibrated at said stress relieving frequency until the frequency location of said at least one of said peaks stabilizes in a frequency location different from its initial frequency location.

10. The method of stress relieving a stressed metal object which comprises the steps of:
 (a) locating the frequency of at least one vibrational resonant peak of the object, and
 (b) stress relieving the object by vibrating the object at a stress relieving frequency which in a plot of the vibrational response of the object as a function of vibrational frequency corresponds to a point which lies on one of the slopes extending away from said at least one vibrational resonant peak.

11. The method called for in claim 10 wherein the frequency of said at least one vibrational resonant peak is located by subjecting the object to vibrations over a range of vibrational frequencies.

12. The method called for in claim 10 including the subsequent step of detecting a relocation of the frequency of said at least one resonant peak to thereby indicate that stress relieving has occurred in response to the application of vibrations at said stress relieving frequency to the object.

13. The method of claim 12 including the further step of thereafter detecting stability of the relocated frequency of said at least one resonant peak to thereby indicate that the stress relief process is complete in response to the application of vibrations at said stress relieving frequency to the object.

14. The method of claim 10 wherein the object is stress relieved by vibrating the object at a stress relieving frequency which corresponds to a point which lies on the slope which extends downwardly from at least one vibrational resonant peak in the direction of decreasing vibrational frequency.

15. The method called for in claim 14 wherein the object is stress relieved by vibrating the object at a stress relieving frequency which corresponds to a point on said last-mentioned slope which lies within the frequency range defined by that portion of said last-mentioned slope which is at approximately the lower third thereof.

16. The method called for in claim 15 wherein the object is stress relieved by vibrating the object at a stress relieving frequency which corresponds to the point within said range nearest said resonant peak.

References Cited
UNITED STATES PATENTS 2,848,775  8/1958  Ettenreich _____ 148—12.9 X
3,622,404  11/1971  Thompson _____ 148—12.9

L. DEWAYNE RUTLEDGE, Primary Examiner

J. E. LEGRU, Assistant Examiner